L. N. COTTERMAN.
HEADLIGHT ADJUSTER.
APPLICATION FILED MAY 14, 1921.
1,433,802.
Patented Oct. 31, 1922.
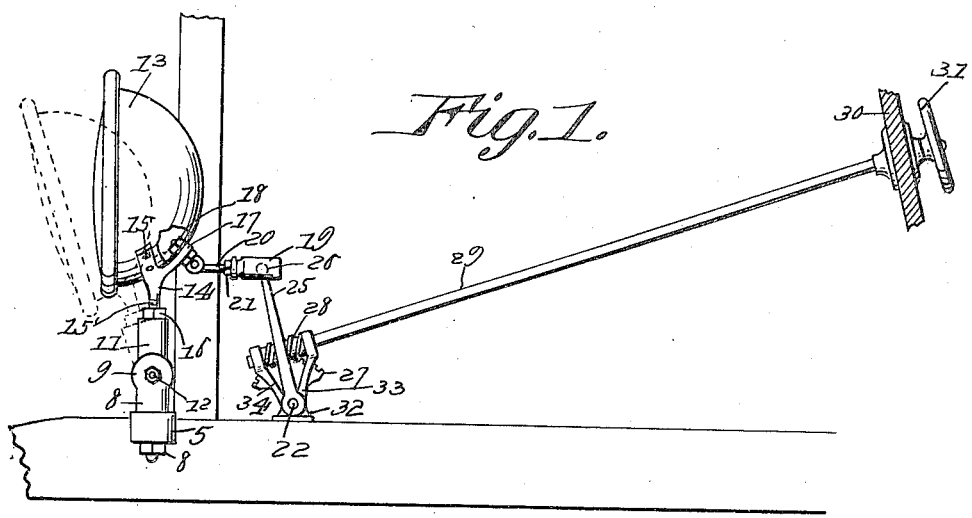
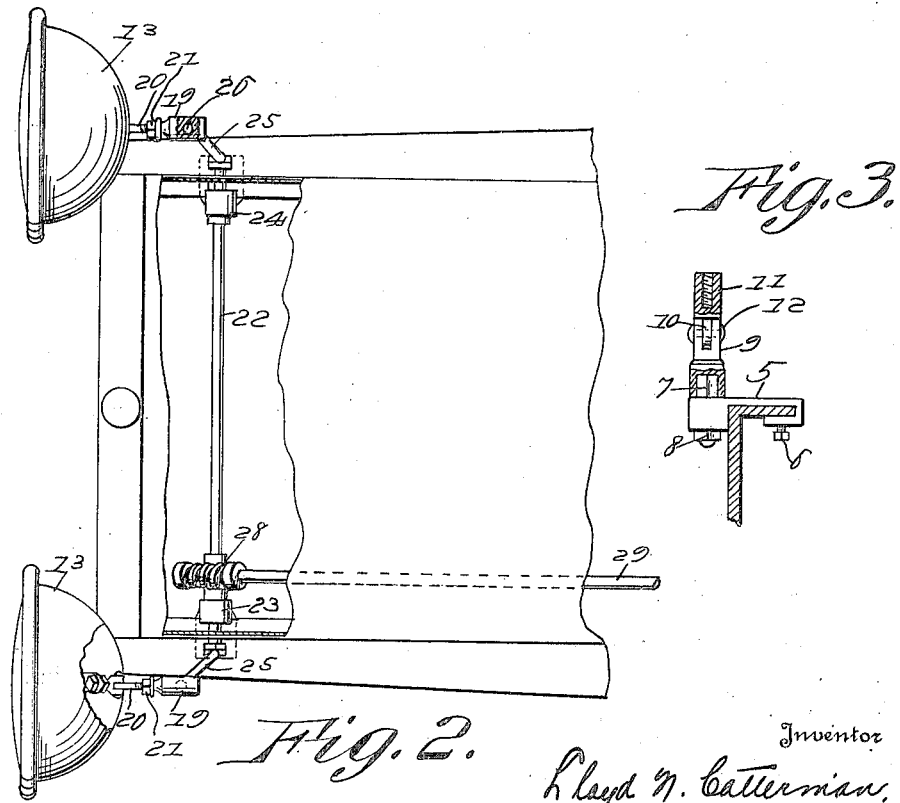
Inventor
Lloyd N. Cotterman,
By Manns Anderman.
Attorney Patented Oct. 31, 1922.

1,433,802

UNITED STATES PATENT OFFICE.

LLOYD N. COTTERMAN, OF NEW BREMEN, OHIO.

HEADLIGHT ADJUSTER.

Application filed May 14, 1921. Serial No. 469,618.

*To all whom it may concern:*

Be it known that I, LLOYD N. COTTERMAN, a citizen of the United States of America, and resident of New Bremen, in the county of Auglaize and State of Ohio, have invented certain new and useful Improvements in Headlight Adjusters, of which the following is a specification.

This invention relates to adjustable headlights for automobiles and the said invention has for its object a provision of novel means for moving headlights for changing the direction of projection of the rays of light in order that persons traveling on a roadway may not have their vision impaired by rays which emanate from a lamp, the said invention furthermore having for its object a provision of an adjusting means having a relatively wide range of movement in order that the rays of light may be directed downwardly or obliquely down at rather a sharp angle or by another adjustment to direct the rays horizontally and by other movements to direct the rays to positions between those just indicated. In fact, the adjustment is so great as to make it possible to direct the rays slightly above the horizontal, but in most conditions of use this is a wider range of adjustment than will be necessary.

A further object of this invention is to produce novel means whereby the two lamps may be moved in unison to the same degree and the invention includes novel means for adjusting the operating mechanism for increasing or decreasing the degree of movement or for changing the pitch or angle to which the rays may be reflected.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a side elevation of the lamp and the operating mechanism embodying the invention;

Figure 2 a top plan view thereof, and

Figure 3 a detailed view partly in section of one of the lamp's standards.

As the mounting for the lamps and the means of communicating motion to them are identical in structure and description, one lamp and its mounting will suffice as a disclosure of the structural features and their cooperative relation.

On each side of a chassis frame I prefer to attach a bracket 5 which may be anchored in suitable manner as by set bolt 6 and the said bracket will have such configuration as to conform to the contour of the frame to which it is to be applied. A post 7 has a portion extending through the bracket engaged by a nut 8 by which the said post is held on the bracket. The upper end of the post is bifurcated as shown at 9 to receive a lug 10 between the furcations and the said lug is formed as a part of a threaded socket 11. A pivot 12 extends through the furcations of the post and the said lug, in order that the socket 11 may oscillate, as will presently appear.

Each lamp 13 has in the present embodiment of the invention a bracket 14 screwed to it in an appropriate manner as by fastenings 15 in the nature of screws or rivets and this bracket has a threaded shank 15 which screws into the socket 11 and it is held in different positions of adjustment by a lock nut 16. The bracket 14 has an apertured extension 17 in which an eye bolt 18 is screwed. A ball socket-joint 19 has a rod 20 threaded in it and secured at different positions of adjustment by a jam nut 21; the said rod having pivotal connection with the eye bolt in order that motion may be communicated to the lamp to oscillate it, as shown in dotted lines Fig. 1. Of course the lamp may be swung rearwardly to a greater degree than that shown in Fig. 1, but the practical utility for the rearward swing connection would not be very great.

A shaft 22 is journaled in suitable bearings 23 and 24 and at each end the said shaft carries an arm 25 having a ball 26 which fits in the socket of the joint 19. As the shaft 22 is partially rotated the arms 25 are oscillated and by this means movement is communicated to the lamps.

The shaft 22 has a tooth segment 27 secured on it which is engaged by a worm 28 on a shaft 29 which preferably extends rearwardly through the dash or front 30 of an automobile, and the end of said shaft is supplied with an operating element 31, such as a hand wheel. A bracket 32 has diverging arms 33 and 34 which form bearings for the shaft 29 and as the shaft 29 is rotated in one or the other directions, motion will be communicated to the shaft 22 and through it to the lamps by the mechanisms described and shown.

Owing to the fact that the worm operates in conjunction with the tooth segment the parts will be retained in the different positions of adjustment, while at the same time they are free to be manipulated for the purpose of changing the positions of the lamps.

During travel it is often desirable to direct the rays of lamps to certain locations on a roadway and to effect this result the rays of light are sometimes so directed as to interfere with the comfort of travelers on the road, so that an operator of a device embodying the invention may momentarily direct the light in a direction which would ordinarily interfere with other travelers, but the lamp could be readjusted to convenient positions speedily thereafter so as to not annoy other travelers.

By the use of this invention, therefore, advantage would be had in the use of lamps which direct the rays quite a distance ahead when the conditions of travel did not cause an annoyance of other occupants of the roadway, but upon the approach of a traveler the adjustment could be made to dip the lamps to direct the rays more downwardly to a point nearer the automobile, a condition which would not interfere with or annoy the approaching traveler.

I claim:

In a headlight adjuster for automobiles, posts, an internal threaded socket pivotally connected to each post, a lamp having a threaded shank adjustable in each socket, an extension formed on each bracket, an eye bolt secured to the said extension, a ball-socket having means whereby it is pivotally connected to an eye bolt, arms having balls fitted to the sockets, a shaft on which the arms are mounted, means for rotatably mounting the shaft, a tooth segment on the said shaft, a shaft extending across the first mentioned shaft, a worm on the second mentioned shaft engaging the teeth of the segment, and means for rotatably mounting the second mentioned shaft.

LLOYD N. COTTERMAN.